United States Patent [19]

Duvoisin, III et al.

[11] Patent Number: 5,835,901
[45] Date of Patent: Nov. 10, 1998

[54] PERCEPTIVE SYSTEM INCLUDING A NEURAL NETWORK

[75] Inventors: Herbert Duvoisin, III, Orlando, Fla.; Hal E. Beck, Knoxville, Tenn.; Joe R. Brown, Austin, Tex.; Mark Bower, Winder Park, Fla.

[73] Assignee: Martin Marietta Corporation, Bethesda, Md.

[21] Appl. No.: 903,345

[22] Filed: Jul. 30, 1997

Related U.S. Application Data

[63] Continuation of Ser. No. 202,751, Jan. 25, 1994, abandoned.

[51] Int. Cl.$^6$ .............................. G06E 1/00; G06E 3/00
[52] U.S. Cl. .............................. 706/19; 706/16; 706/25; 706/31
[58] Field of Search .............................. 706/15–18, 20, 706/21, 25, 26, 27, 19, 31

[56] References Cited

U.S. PATENT DOCUMENTS

| | | | |
|---|---|---|---|
| 3,440,617 | 4/1969 | Lesti | 706/45 |
| 4,912,649 | 3/1990 | Wood | 706/45 |
| 4,912,651 | 3/1990 | Wood et al. | 706/25 |
| 4,912,652 | 3/1990 | Wood | 706/25 |
| 4,912,654 | 3/1990 | Wood | 706/25 |
| 4,912,655 | 3/1990 | Wood | 706/25 |
| 5,041,976 | 8/1991 | Marko et al. | 701/29 |
| 5,080,064 | 1/1992 | Buslepp et al. | 123/399 |
| 5,083,541 | 1/1992 | Chen | 123/339.17 |
| 5,090,388 | 2/1992 | Hamburg et al. | 123/674 |
| 5,093,792 | 3/1992 | Taki et al. | 701/99 |
| 5,095,443 | 3/1992 | Watanabe | 726/10 |
| 5,113,483 | 5/1992 | Keeler et al. | 706/45 |
| 5,121,467 | 6/1992 | Skeirik | 706/10 |
| 5,276,771 | 1/1994 | Manukian et al. | 395/24 |
| 5,384,895 | 1/1995 | Rogers et al. | 395/23 |
| 5,438,629 | 8/1995 | Moed et al. | 382/156 |

OTHER PUBLICATIONS

Sin, S.–K. and R.J.P deFigueiredo. "A method for the design of evolutionary multilayer neural networks." IEEE Intl. Conf. on Neural Networks, Mar. 1993.

Whitehead, B.A. and T.D. Choate. "Evolving space-filling curves to distribute radial basis functions over an input space." IEEE Trans. on Neural Networks, Jan. 1994.

Larry Medsker and David Bailey."Integrating Expert Systems and Neural Networks." IEEE/ACM Intl. Conf. on Developing & Managing Expert System Programs. Sep. 30–Oct. 2., 1991.

Confidential Demonstration of prototype system at Fort Drum, New York in May 1991.

Newspaper article, circa Dec. 1991–Feb. 1992, describing Oct. 1991 test of a Martin Marietta classifier system in Idaho.

Jan. 26, 1993 offer for sale of a system embodying features now claimed in the application.

Primary Examiner—Taric R. Hafiz
Attorney, Agent, or Firm—Burns, Doane, Swecker & Mathis, LLP

[57] ABSTRACT

A real-time learning (RTL) neural network is capable of indicating when an input feature vector is novel with respect to feature vectors contained within its training data set, and is capable of learning to generate a correct response to a new data vector while maintaining correct responses to previously learned data vectors without requiring that the neural network be retrained on the previously learned data. The neural network has a sensor for inputting a feature vector, a first layer and a second layer. The feature vector is supplied to the first layer which may have one or more declared and unused nodes. During training, the input feature vector is clustered to a declared node only if it lies within a hypervolume defined by the declared node's automatically selectable reject radius, else the input feature vector is clustered to an unused node. Clustering in overlapping hypervolumes is determined by a decision surface. During testing of the RTL network, the same strategy is applied to cluster an input feature vector to declared (existing) nodes. If clustering occurs, then a classification signal corresponding to the node is generated. However, if the input feature vector is not clustered to a declared node, then the second layer outputs a signal indicating novelty. The RTL neural network is used in a perceptive system which alternatively selects the RTL network novelty output or the output of a classifier trained on historical target data if the input vector is a subset of the historical target data.

27 Claims, 9 Drawing Sheets

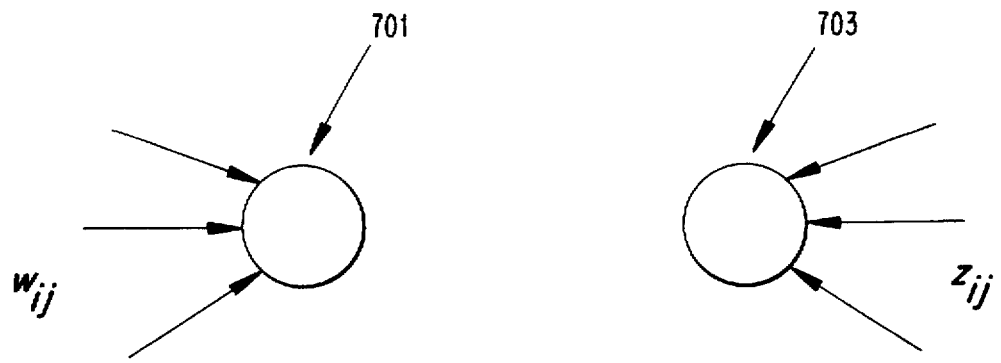
Fig. 7(a)
(PRIOR ART)
Fig. 7(b)
(PRIOR ART)
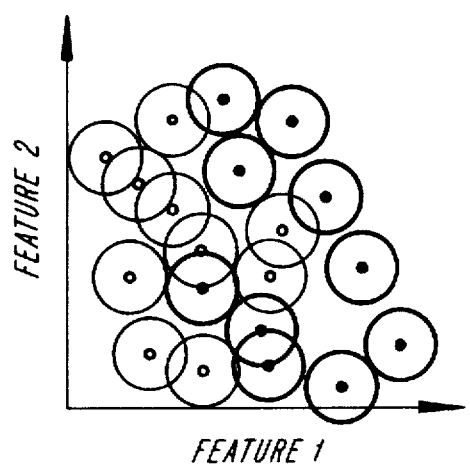
Fig. 8

PERCEPTIVE SYSTEM INCLUDING A NEURAL NETWORK

This application is a continuation of application Ser. No 08/202,751, filed Jan. 25, 1994, now abandoned.

BACKGROUND

The present invention relates to a system which operates on signals in real time to effect adaptive knowledge representation and decision making for interaction with the environment, and even more particularly to a system having a plurality of neural network substructures or classifiers, at least one of which acquires and represents external world knowledge in real time.

Information about an environment may be obtained by means of sensors which are adapted to detect particular characteristics of that environment, and produce corresponding signals. Examples of such sensors include radar, infrared detectors, optical detection devices, and microphones, to name just a few. The possibility of using artificial intelligence (AI) systems to transform sensor signals into useful information that can be acted upon has been investigated since the 1950s. Applications where AI has been particularly useful include the fields of engine control and image processing. In image processing, digitized sensor values representing picture elements, or "pixels," are processed by a computer to achieve a desired result. Often, special purpose image-processing computers are used to increase the speed of the processing operations, with the sequence of processing operations called an algorithm. The processed result provides digital measurements of the image. Such measurements may, for example, identify scene elements for use in an automatic target recognition (ATR) system.

The classifiers in such ATR systems often include neural networks. Neural networks have a structure imitative of the human brain's interconnected system of neurons. Unlike conventional digital computers, neural networks do not follow rigidly programmed rules. Rather, they build an information base through a trial-and-error method. In this way a neural network "learns" from its mistakes and gives more accurate output with each repetition of a task or with increasing numbers of examples. Simple neural networks were built in the late 1950s, but little progress was made in the field until more powerful processing techniques were developed a few decades later.

Systems employing neural networks for use in applications such as target detection and engine control have not included real time feedback to improve performance because they have been set up to transfer information in one direction only, directly from the sensor through the classifier. The updating of such systems in order to improve performance has heretofore taken place only in non-real time (i.e., slower than the rate at which data signals are collected). For example, standard ATR techniques known to persons having ordinary skill in the art include an image processing algorithm that is set up ahead of time to look for the particular appearance of the target, perform feature extraction from the selected areas in the image wherein such appearances were apparently found, and classify those appearances according to their likelihood of actually being the object searched for. However, there is no real-time feedback path to modify the classification process to recognize a newly encountered set of feature appearances.

In this standard ATR process, the first step includes a training process, in which scenes containing typical appearing targets are measured for the purpose of designing a target detection algorithm that will attempt to maximize true target object selection while minimizing selection of non-interesting objects (non-target objects in the background terrain comprising clutter and so-called false alarms). Designing the detection algorithm involves determining the features or characteristics of these sample target objects (size, shape, intensity, etc.) and then determining the separation in feature space between targets and clutter using the standard classification techniques, which may include neural networks. The feature space is called phase space in control theory, and in each case refers to a plot of vectors of different object feature values. The phrase "feature space" will be used throughout this document. However, the discussion is equally applicable to control theory, in which the phrase "phase space" would more typically be used.

FIG. 1(a) illustrates a two-dimensional feature space. The dark and light circles represent target and non-target regions, respectively. FIG. 1(b) illustrates a so-called "feature volume", that is, a feature space that is a function of three independent features. The number of independent features may be more than three, thereby creating what is called a hypervolume.

Past attempts at ATR using these methods have required the selection and training of algorithms and classifiers based on field test (or modeled) target signatures prior to testing. This has entailed problems when the system was actually tested on new imagery, since the training conditions were necessarily different from the new imagery conditions. This is especially true for military applications where the targets are viewed at wavelengths that image the heat energy emitted, which is in turn extremely dependent on the prior history of the target and the weather it has been exposed to. The non-target objects that are confused as targets also become problematical since the new imagery, again necessarily different from the training data, causes false alarms at undesirable levels. This is because the clutter object signatures are also driven by the weather, and the objects themselves are pieces of the terrain, itself varying from place to place. Attempts at thermal model based approaches have been only rarely successful because of the capriciously varying nature of the target and background signatures. Recent research (since the 1960s) has indicated that this is because of the "chaotic" nature of non-linear coupled systems—real systems in nature such as the weather (or weather affected objects).

A chaotic system is defined as one that shows "sensitivity to initial conditions." That is, any uncertainty in the initial state of the given system, no matter how small, will lead to rapidly growing errors in any effort to predict the future behavior. This makes any long-term prediction of the appearance of the real target object or clutter objects infeasible because of their weather dependence. Their behavior can be predicted perfectly only if the initial conditions are known to an infinite degree of accuracy, which is impossible.

A number of prior art solutions to the classification problem exist, but do not adequately address this prediction problem. These will now be described and compared with reference to FIGS. 2(a)–2(c).

FIGS. 2(a) and 2(b) illustrate, respectively, the operation of a linear classifier and that of a quadratic classifier. In the depicted graphs of feature space, feature vectors corresponding to clutter (empty circles) and targets (solid circles) are plotted. Classification is performed by determining a discriminant function (represented for the linear classifier by the decision line 201, and for the quadratic classifier by the decision curve 203) upon which classification will be based.

Linear classifiers offer perhaps the lightest computational burden of all classifiers, because they are computationally simple. This computational simplicity derives from the ease with which an exemplar vector can be identified as being on one side or the other of a simple curve. The linear discriminant function $$g(x) = w_o + \sum_{i=1}^{d} w_i x_i$$

and that of the quadratic discriminant $$g(x) = w_o + \sum_{i=1}^{d} w_i x_i + \sum_{i=1}^{d} \sum_{j=1}^{d} w_{ij} x_i x_j$$

both utilize weight vectors, w, to partition feature space (i.e., all possible combinations of values of the features, or characteristics, under consideration) and also use the same decision rule to classify exemplar vectors, i.e., class 1 if $g(x)>0$, class 2 if $g(x)<0$. The decision line 201 and the decision curve 203 in FIGS. 2(a) and 2(b), respectively, represent where $g(x)=0$, and d represents the number of dimensions in feature space. The discriminant weights are determined analytically, normally by eigenspace decomposition. However, linear and quadratic classifiers suffer from a lack of flexibility in describing feature space. The feature sets themselves must naturally separate along curves which are attainable by either a line or a second order curve; else performance will suffer. For example, in FIG. 2(a), it can be seen that two clutter vectors, lying to the right of the decision line 201, will be misclassified as targets, and that three target vectors will be misclassified as clutter. The quadratic classifier depicted in FIG. 2(b) suffers from a similar problem.

The making and using of linear and quadratic classifiers is well known in the art, and is described for example in *Pattern Classification And Scene Analysis* by Richard 0. Duda and Peter E. Hart, published by John Wiley & Sons (1993), which is incorporated herein by reference.

Referring now to FIG. 2(c), a backpropagation neural network (BPN) (also referred to as a back-error propagation neural network) will now be described. The word "backpropagation" refers to the fact that during training, when the network produces an incorrect result the correction mechanism starts with the output units and propagates the error backward through each internal layer to the input layer. Backpropagation neural networks produce a decision surface, rather than a line, which is extremely adaptable to very high-order separations between classes and can thus approach performance optimums for classification. However, this accuracy does not come without a price, for it requires not only a large amount of training data, but also the ability to satisfy a high computational burden. To generate the decision surface of a BPN (FIG. 2(c) illustrates a "slice" through an exemplary BPN decision surface 205), no a priori assumption is made as to the underlying distribution of the features. Rather, this must be inferred from the data. Furthermore, a "kernel" function is used at each node in the network and the decision surfaces formed are superpositions of this kernel. The kernel is known as a sigmoid function, which is shown by the following equation:

$$f_j(x) = \frac{1}{1 + \exp^{-\Sigma w_{ij} x_i}}$$

where $f_j$ is the output of the jth node in the network, $w_{ij}$ is the weight from node i to node j, and $x_i$ is the output of node i. The nodes are stacked in hierarchical layers with the sum of outputs from previous layers serving as the inputs to higher layers. The power of backpropagation arises from the nonlinear decision surfaces determined by gradient descent, which minimizes error from the output nodes back to the input nodes. No attempt is made to limit the region over which the probability density function (PDF) is approximated; rather a global PDF is approximated. These two features, global PDF and gradient descent training, dramatically increase the amount of data required to achieve acceptable levels of PDF approximation. Along with large training sets comes the additional undesirable amount of time required to cycle through the training data several times. Any attempt to mitigate the undesirable effects of these requirements, either by limiting the size of the data set or by restricting the number of training iterations, results in a degradation of classifier performance. Thus, BPN is suited for virtually any degree of complexity of decision surface as long as the data set to be processed is large and time restrictions are lenient.

BPN is well known in the art, and is described for example in *Neural Networks Primer, Third Edition Revised*, by Maureen Caudill, published by "AI Expert" (1993), and also in *Neurocomputing* by Robert Hecht-Nielsen, published by Addison Wesley Publishing Co. (1990), both publications of which are herein incorporated by reference.

In addition to BPN, two additional methods of classifiers exist which, instead of deriving a decision boundary analytically, rely upon the iteration of probability estimations to approximate an underlying PDF. These nonparametric classifier methods are called "k-Nearest Neighbors" (kNN) and Parzen windows. Like the BPN method, each of the kNN and Parzen windows methods approximates PDFs in a limit of estimations with relatively few assumptions about feature space and, most importantly, no a priori determination of underlying PDFs. Also like the BPN method, a "kernel" function is used at each node in the network and the decision surfaces formed are superpositions of this kernel. According to these nonparametric methods, a window residing in feature space expands or contracts to create a series of estimations of the PDF. It has been shown that these estimations accurately model a training data set. The basic estimation of the PDF for iteration n is:

$$P_n = \frac{(k_n/n)}{v_n}$$

where k is the number of vectors in the training set, and v is the volume of observed feature space. It is seen that the PDF varies as a function of either k or v. If the user makes v a function of n which approaches 0 as n becomes large but does so more slowly than $1/n$, then the estimation takes the form of iterated convolutions of PDF kernels and is known as the Parzen window method of classification. On the other hand, if k is made a function which is directly proportional to n, the volume of observed hyperspace increases and the estimation takes the form of an ever-increasing summation of surrounding examples. In signal classification tasks, this latter method can be used by counting each example vector in the increasing volume as a "vote" and classifying based on a majority of surrounding examples within the increasing volumes Nonparametric methods, such as the Parzen window and the kNN discussed above, are suitable when the dimension is large, but the problem is separable.

Nonparametric methods are well known in the art, and are discussed, for example, in *Pattern Classification And Scene Analysis* by Duda and Hart, which was cited and incorporated by reference above.

The above-described prior art techniques are useful when applied to correspondingly suitable problems. However, there are applications, such as minefield detection, for which none of the above techniques are suitable. This is because such applications are characterized by fairly high dimensions of features, extremely discontinuous yet overlapping distributions of feature vectors, potentially few target exemplars, and potentially large numbers of clutter vectors. Therefore, there is a need for systems which can quickly and accurately make desired perceptions about this type of environment. It is desirable, then, to provide a classifier that is capable of real time learning so that it can adapt to input data that is collected under conditions that differ from historical training data (which is usually obtained at least one day prior to a mission).

One prior art neural network architecture of interest is the Kohonen Self-Organizing Map (SOM). The SOM is fully described in the *Neural Networks Primer* by Maureen Caudill, which was cited and incorporated by reference above. A SOM 301 is depicted in FIG. 3. The SOM 301 maps n-dimensional feature space into 2-dimensional map space while preserving local "connectedness" between features in the process. That is, points that are close to each other in feature space will also be close to each other in map space. Such a mapping is called a topology preserving mapping. In implementation, each node in the map has weights connecting it to each feature in the input layer. These weights can be seen as a vector that points into feature space, changing its direction to point more closely to the location of the training data each time a node wins a competition against the other nodes and gets updated. The vector emanates from the origin of feature space and extends to the point in feature space represented by the feature vector. This competition identifies the node which most nearly "points" in the same direction as the particular training vector as each training vector is applied. Not only does the "winning" vector update its weights, but to a lesser degree, so do its neighbors. In this way, the Kohonen layer begins to organize local recognition regions for the different classes. The capability of the Kohonen layer to build a local representation of feature distributions is a desirable characteristic, but this prior art algorithm requires too much computation time to be considered useful in a "real-time" application.

The counterpropagation network (CPN) is another prior art neural network architecture of interest to the present problem of providing a classifier that is capable of real time learning. The CPN is fully described, for example, in *Neurocomputing* by Hecht-Nielsen, which was cited and incorporated by reference above. In the CPN, which is depicted in FIG. 4, the nodes 401 compete against one another for the chance to update their weights to match the input vector, as was the case for the SOM. However, in the case of the CPN, the winner is simply the closest node. This "nearest-neighbor" clustering technique suffers from the problem that the number of clusters must be defined at the start and that the resultant vector distribution will depend on the order of training vector presentation. Without any measure of how well a node describes an incoming feature, it is impossible to detect when the input vector is so far from any of the existing nodes that it should really be identified as something not previously seen within the system (referred to throughout this text as "novelty detection"). Also, the nearest-neighbor competition requires that each training vector be stored for use in the optimization routine as new vectors appear. To continuously train the network still requires that all training vectors be used for each update, making CPN also too slow for a "real-time" algorithm. However, once trained, it includes the benefit of rapid classification.

It is desirable, then, to design an architecture that exhibits both the local neighborhood modeling capabilities of the Kohonen map and the computationally efficient combination of clustering and adaptive look-up of the CPN, but which is also capable of real-time learning and novelty detection.

SUMMARY

It is therefore an object of the present invention to provide a system that is useful for classification and control applications in an environment characterized by disjoint, discontinuous distributions of vectors in high-dimensional space where vectors (such as "targets" in the case of ATR technology) are potentially sparse.

In accordance with one aspect of the present invention, the foregoing and other objects are achieved in a neural network, comprising input means, a first layer and a second layer. The input means receives a feature vector, which, for example, may be derived from data collected by a sensor. The feature vector is supplied to the first layer which has a node. If a distance between the input feature vector and a node feature vector is less than a reject radius associated with the node, then the input feature vector is clustered to the node, and a classification signal corresponding to the node is generated. The second layer is coupled to the first layer, and includes means for outputting a novelty signal if the first layer fails to generate a classification signal. This arrangement may be useful, for example, in identifying a potential target when the neural network has been trained on a data set which includes feature vectors corresponding only to clutter.

In accordance with another aspect of the invention, evolutionary techniques are used for automatically selecting a reject radius from randomly generated reject radii.

In accordance with still another aspect of the invention, a neural network comprises input means for receiving an input feature vector, and a first layer, coupled to the input means. The first layer includes a declared node and an unused node. The neural network further comprises first means for clustering the input feature vector to the declared node only if a distance between the input feature vector and a declared node feature vector is less than a reject radius associated with the declared node; and second means for clustering the input feature vector to the unused node only if a distance between the input feature vector and the declared node feature vector is not less than a reject radius associated with the declared node. This architecture permits the neural network to learn to generate a correct response to a new data vector while maintaining correct responses to previously learned data vectors without requiring that the neural network be retrained on the previously learned data vectors. For this reason, it is referred to as a real-time learning (RTL) neural network.

In accordance with yet another aspect of the invention, a neural network comprises input means, a first layer and first means. The input means receives an input feature vector. The first layer, which is coupled to receive the input feature vector from the input means, comprises a first declared node and a second declared node. The first declared node includes a first feature vector and a first hypervolume defined by the first feature vector and a first reject radius. Similarly, the second declared node includes a second feature vector and a second hypervolume defined by the second feature vector and a second reject radius, wherein a portion of the second hypervolume overlaps a portion of the first hypervolume, thereby defining an overlapping region. The first means clusters the input feature vector alternatively to the first declared node or the second declared node only if the input feature vector lies within the overlapping region. This architecture permits a neural network to classify an input feature vector as either of two classes which it has previously learned to identify, or alternatively to learn the classification of the input feature vector without disturbing previously learned information.

In accordance with still another aspect of the invention, the first means determines which of the first or second declared nodes the input feature vector will be clustered to in accordance with maximum likelihood statistics. Alternatively, the first means may determine which of the first or second declared nodes the input feature vector will be clustered to in correspondence with which of a first Euclidean distance and a second Euclidean distance is smaller, where the first Euclidean distance is determined from the input feature vector to an arithmetic mean of the first declared node, and the second Euclidean distance is determined from the input feature vector to an arithmetic mean of the second declared node.

In accordance with another aspect of the invention, a perceptive system comprises input means, a first classifier, first means, novelty detection means, and selection means. The input means receives an input feature vector. The first classifier is trained on a training data set that includes a target feature vector. In the perceptive system, the first classifier is coupled to the input means so that it can generate a first classification signal corresponding to the input feature vector. The first classifier may, for example, be a prior art classifier, such as a Backpropagation Neural Network which has been trained on historical data.

The first means, which is also coupled to the input means, generates a first signal indicative of whether or not the input feature vector is a subset of the training data set. The first means may, for example, be a prior art Feature Map Neural Network using a convex hull algorithm.

The novelty detection means are also coupled to the input means, and generate a novelty signal in response to the input feature vector not being classifiable as clutter. For example, the novelty detection means may be the inventive RTL neural network, which has been trained on a data set that includes only examples of clutter. During testing of this neural network, if an unrecognized feature vector is presented at the input, the neural network emits a signal indicating that the feature vector is novel (i.e., not classifiable as any clutter that it has previously seen).

The selection means in the perceptive system are coupled to the first classifier, the first means, and to the novelty detection means. The selection means uses the first signal to select as a system output either the first classification signal or the novelty signal. The strategy employed here is that if the first signal indicates that the input feature vector is a subset of the training data set of the first classifier, then the output of the first classifier is likely to be reliable and should be selected. However, if the input feature vector is not a subset of the first classifier's training data set, then it may not produce reliable classifications. In this instance, the selection means may achieve better system results by selecting the output of the novelty detection means, since an input feature vector which is not classifiable as clutter may be more likely to be a target object.

In accordance with another aspect of the present invention, the selection means in the perceptive system may be an expert system.

In accordance with yet another aspect of the present invention, the novelty detection means may be the inventive RTL neural network which is trained on a training set of feature vectors corresponding to clutter. Since the RTL neural network may be trained on individual feature vectors without disturbing previously learned information, it is particularly useful because the training on clutter can occur just at the beginning of a mission to identify targets.

BRIEF DESCRIPTION OF THE DRAWINGS

The objects and advantages of the invention will be understood by reading the following detailed description in conjunction with the drawings in which:

FIGS. 7($a$)–7($b$) depict, respectively, a Grossberg instar and a Grossberg outstar;

FIG. 8 depicts a graph of the operation of the RTL classifier in accordance with the present invention;

DETAILED DESCRIPTION

The several aspects of the present invention will now be described with reference to the particular field of information processing called image processing, and for the particular case of detecting and classifying individual mines in a minefield. However, this application of the present invention is intended to be merely exemplary. One of ordinary skill in the art will readily see that the problems and solutions presented with respect to the mine detection scenario are equally applicable to problems involving the selection of any other target object and rejection of non-target objects (i.e., "clutter") which may be encountered in other image processing situations. Furthermore, the present invention is not limited to applications involving image processing, but rather is equally applicable to any control or decision making problem merely by substituting phase space data for the feature space data that is referred to in the following description.

In order to adequately handle the uncertainties in real world data, the decisions resulting in selection of candidate objects from the scene must take place in real time. This is because, for example in automatic target recognition (ATR), the characteristics of the targets and background clutter change due to weather, time of day, and changing terrain itself. To accomplish this, the perceptive system must include introspection with the ability to modify its "memory" and "behavior" and internal structure in real time based upon feedback. Thus, the present invention relies on several inventive concepts, including the use of real time solutions rather than pre-identified potential solutions, the use of neural networks in parallel which are complementary, and the adaptive selection of reject radii (to be explained later) in real time for clustering.

Figure 1B:
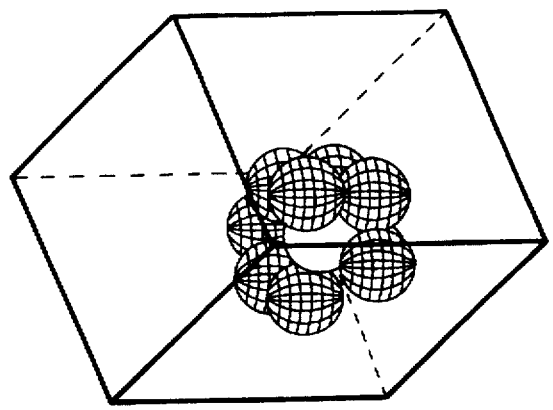
FIGS. 1($a$)–1($b$) depict feature space and feature volume, respectively.
Figure 1A:
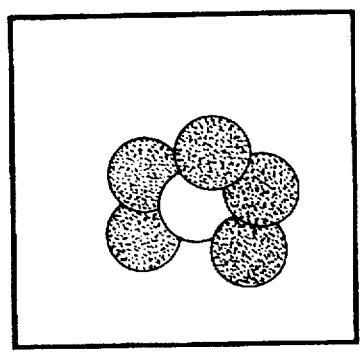
Figure 2C:
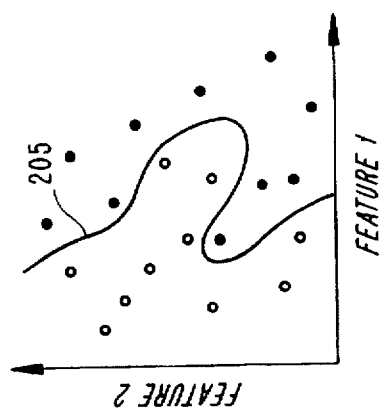
FIGS. 2($a$)–2($c$) depict graphs of the respective decision surfaces of a linear classifier, a quadratic classifier, and a backpropagation classifier.
Figure 2B:
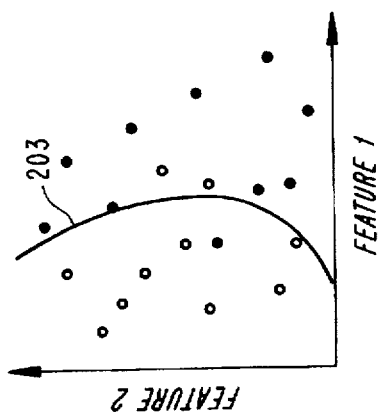
Figure 2A:
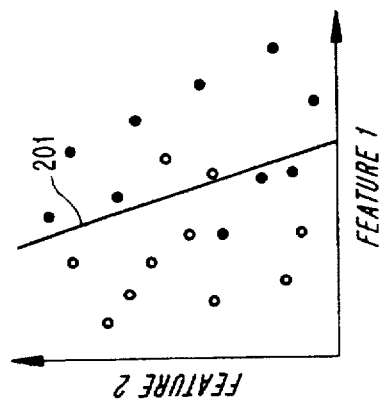
Figure 3:
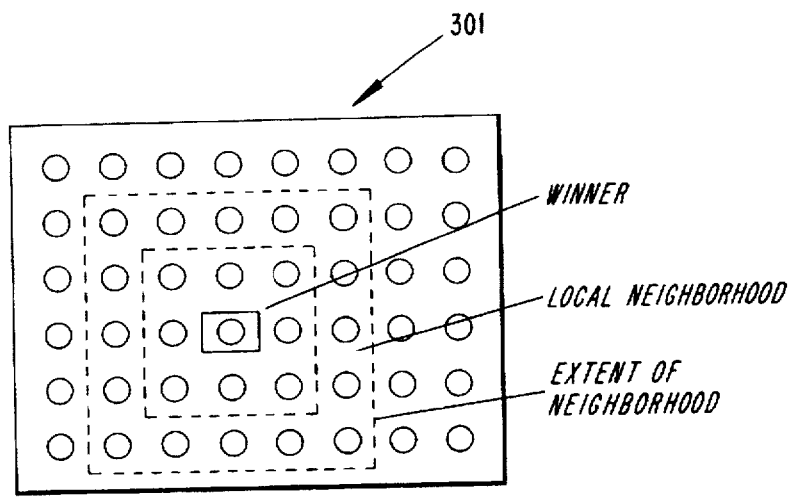
FIG. 3 is an illustration of a Kohonen self-organizing map.
Figure 4:
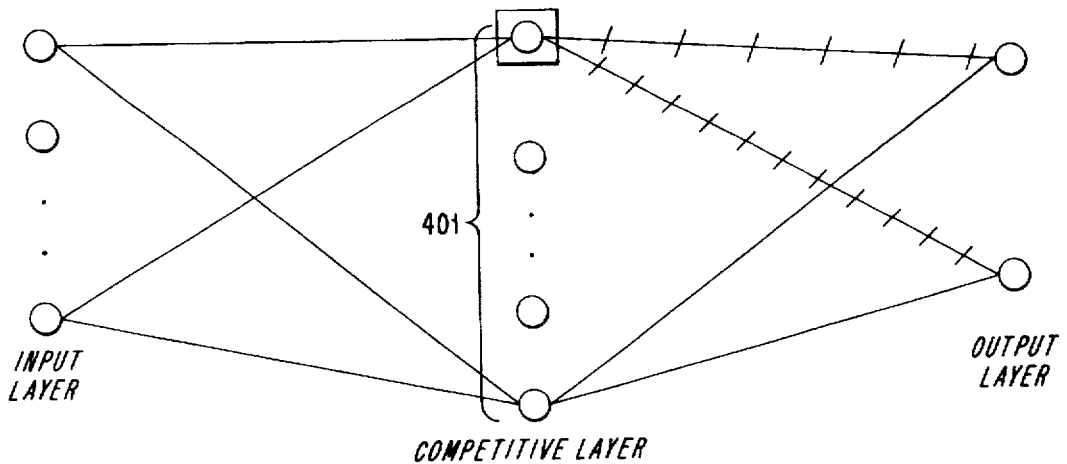
FIG. 4 is a diagram of a counterpropagation neural network.
Figure 5:
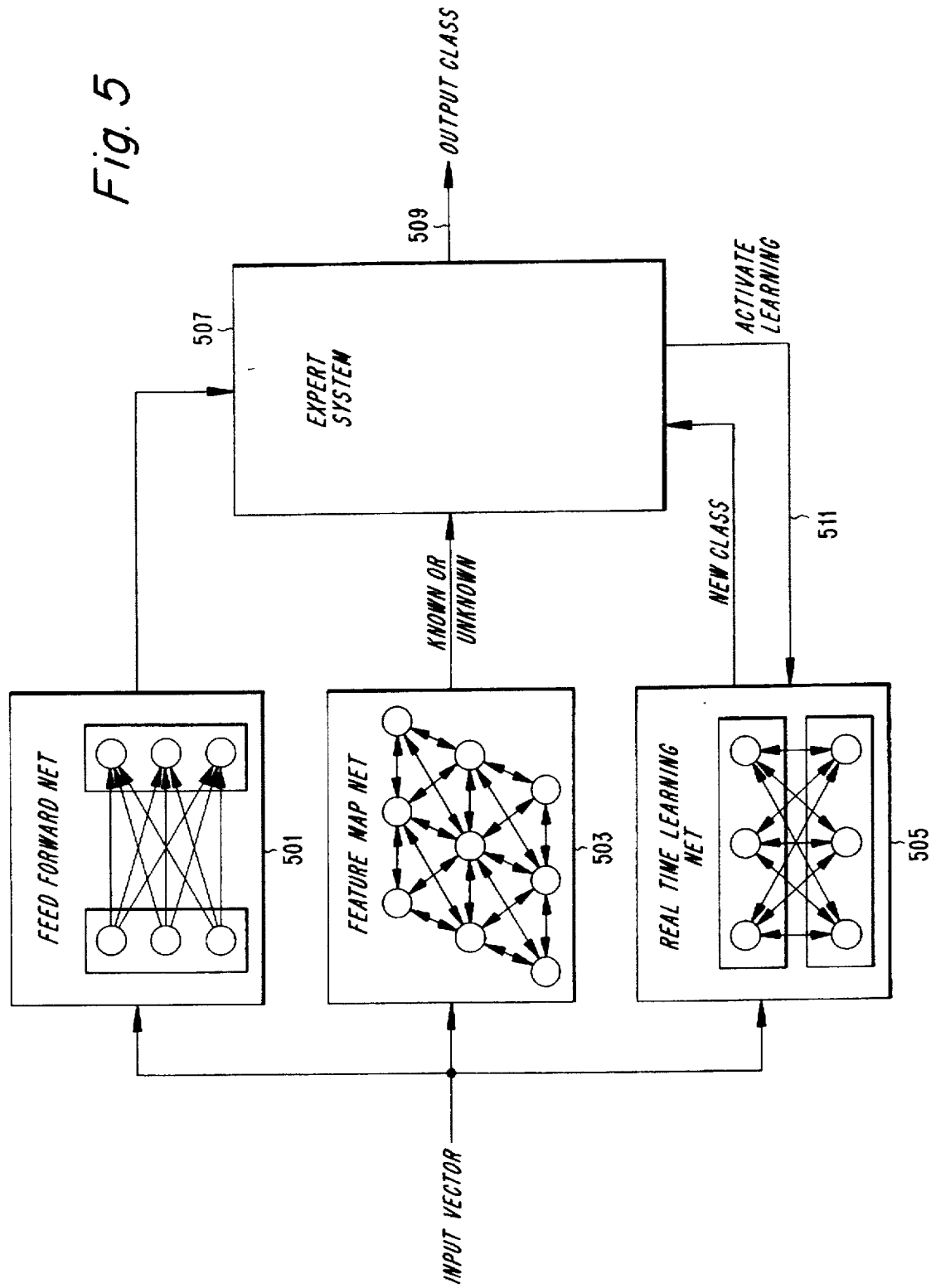
FIG. 5 is a block diagram of a preferred embodiment of the present invention.

A block diagram of a preferred embodiment of the present invention is shown in FIG. 5. The perceptive system comprises at least three neural networks (or classifiers): a feed forward network 501, a feature map network 503, and a real time learning (RTL) network 505. Each of these three networks is coupled to receive an input vector from a source (not shown), such as a real time sensor coupled to a feature extraction device, that is common to all three. In a preferred embodiment, the feature extraction device is implemented on a processor having a single instruction multiple data (SIMD) architecture, such as that which is described by U.S. Pat. No. 4,739,474 to Holsztynski, and U.S. patent application Ser. No. 08/112,540 to Meeker, filed on Aug. 27, 1993, the entire disclosures of which are incorporated herein by reference. The SIMD processor is preferred over the general purpose digital computer as a source of input vectors because it is capable of very fast image processing. This is of great advantage in the problem of real time target detection.

The operation of each one of the three neural networks 501, 503, 505 is independent of the operation of the other two, and will be described in detail below. Completing the description of the system in general, the output from each of the three neural networks 501, 503, 505 is coupled to an expert system 507, whose job is to select one output from among the three that have been provided by the neural networks 501, 503, 505. The operation of the expert system 507 will be described in more detail below. The feedback path 511 permits the expert system 507 to initialize and update the class assignments in the RTL network 505. Each of the three neural networks 501, 503, 505 as well as the expert system 507 are preferably implemented as computer programs running on digital computer hardware using techniques which are well-known to those of ordinary skill in the art. A complete description of this implementation is beyond the scope of the present description, and is unnecessary to enable one having ordinary skill in the art to make and use the invention, since the following functional description is fully sufficient for this purpose.

The operation of the perceptive system will now be described in more detail. The system comprises at least three processors which operate on an input vector in parallel (i.e., simultaneously). The first of these processors functions as a classifier that has been trained on data that was collected at least one day prior to the time of its intended use. Such data is referred to throughout this text as "historical" data. The reason for the use of such "old" data stems from the very long time required to train the first processor. This first classifier may be any of the prior art classifiers described in the background section of this specification, and is preferably the feed forward network 501 shown in FIG. 5. The feed forward network 501 is trained using the well-known backpropagation of errors method. The output classification from the feed forward network 501 is coupled to an input of the expert system 507.

The purpose of the feed forward network 501 is to provide a classification decision that is based on an analysis of historical data. Consequently, in an alternative embodiment of the present invention, the first classifier may instead be of a type to be described with respect to the third classifier, provided that it has previously been shown to exhibit good performance under conditions similar to those encountered at the time and place of interest. The reason for this will become apparent from the description of the second and third classifiers. For the remainder of this description, reference will only be made to the feed forward network 501. However, it should be kept in mind that the following system description is equally applicable to the alternative embodiment just described.

The second classifier is the feature map network 503, which may consist of a convex hull algorithm to determine whether or not a new feature vector comes from the same general region of feature space as did the training data. The convex hull algorithm is fully described in *Numerical Recipes in C*, by William H Press et al., published by Cambridge Press (1988), which is incorporated herein by reference. Determining whether or not a new feature vector comes from the same general region of feature space as did the training data is accomplished by comparing the input feature vector, which is being received in real time, to the historical data set that was used to train the feed forward network 501. A correlation between the two data sets indicates that the output of the feed forward network 501 has a high probability of being accurate. The feature map network 503 provides this correlation information to the expert system 507.

When the output of the feature map network 503 indicates that the input feature vectors match the historical data that was used to train the feed forward network 501, the expert system 507 treats the output of the feed forward network 501 as valid, and may use this output as the output of the perceptive system. However, if the feature map network 503 indicates that the input vector does not correspond to the historical data, then the output of the feed forward network 501 may not be reliable. To accommodate this situation, the perceptive system is provided with at least one other classifier, which is the real time learning (RTL) network 505 in FIG. 5. In accordance with the present invention, the RTL network 505 is capable of learning to make accurate classifications of input feature vectors in real time during a mission (i.e., during a training session involving data that needs to be classified), without having to be pretrained on historical data prior to the mission. Of significance is the fact that performance of the RTL network may be incrementally improved in real time as new examples of known targets or clutter are introduced into the network one by one. This is in sharp contrast to the prior art classifiers, which must be retrained on an entire dataset if even one additional known feature vector is added to improve performance. In essence, the RTL network 505 is trained during the actual mission at the same time that its classification decisions are potentially being selected for output by the expert system 507. Training of the RTL network 505 may be in accordance with either of two training modes, which are fully described below.

Before beginning a discussion of the architecture of and methods for training an RTL network, the expert system 507 will first be described. The expert system ties the entire perceptive system together, since it receives the outputs of each of the three networks 501, 503, 505, and itself produces one output 509 which represents the output of the system.

The purpose of the expert system is to select a best final decision from among the respective outputs of the historically trained feed forward network classifier 501, and the RTL network classifier 505. This is accomplished in the following steps through the use of sample trials. As stated above, a boundary (or hull) description of the training data (represented by the feature map network 503) is created prior to testing the perceptive system. The expert system 507 examines the output of the feature map network 503 in order to determine whether the current data vectors being received from the sensors can be considered a subset of the historical training data set. (In the above-described alternative embodiment in which the feed forward net 501 is replaced by a previously trained RTL network (not shown), the historical training data set may be a clutter description.) The degree to which the new vectors are declared known (i.e., a subset of the historical data set) is based on the percentage of the total number of new vectors that fall within the training data description. The new data is then ground truthed (i.e., analyzed to determine which vectors really are targets and which ones aren't) after being classified by the historically trained feed forward network 501. A correlation curve is then constructed that compares the percentage overlap with the correct classification. This correlation curve is then used by the Expert System to assign confidence to the historically trained output on future trials. (Note that the foregoing assumes the environmental data such as time of day, sky conditions, soil conditions, etc. that might influence target or clutter appearance is included in the training and test vectors. If not, then a characteristic description must be assigned to each data set and the appropriate one chosen based on this.)

Sample trials are then also executed for the RTL network 505, and correlation curves are subsequently generated for its output. These curves are then used by the expert system 507 to determine the target or non-target declaration and to assign a relative confidence measure.

The expert system 507 selects as its output 509, the output of whichever classifier produced the most confident classification.

Figure 6:
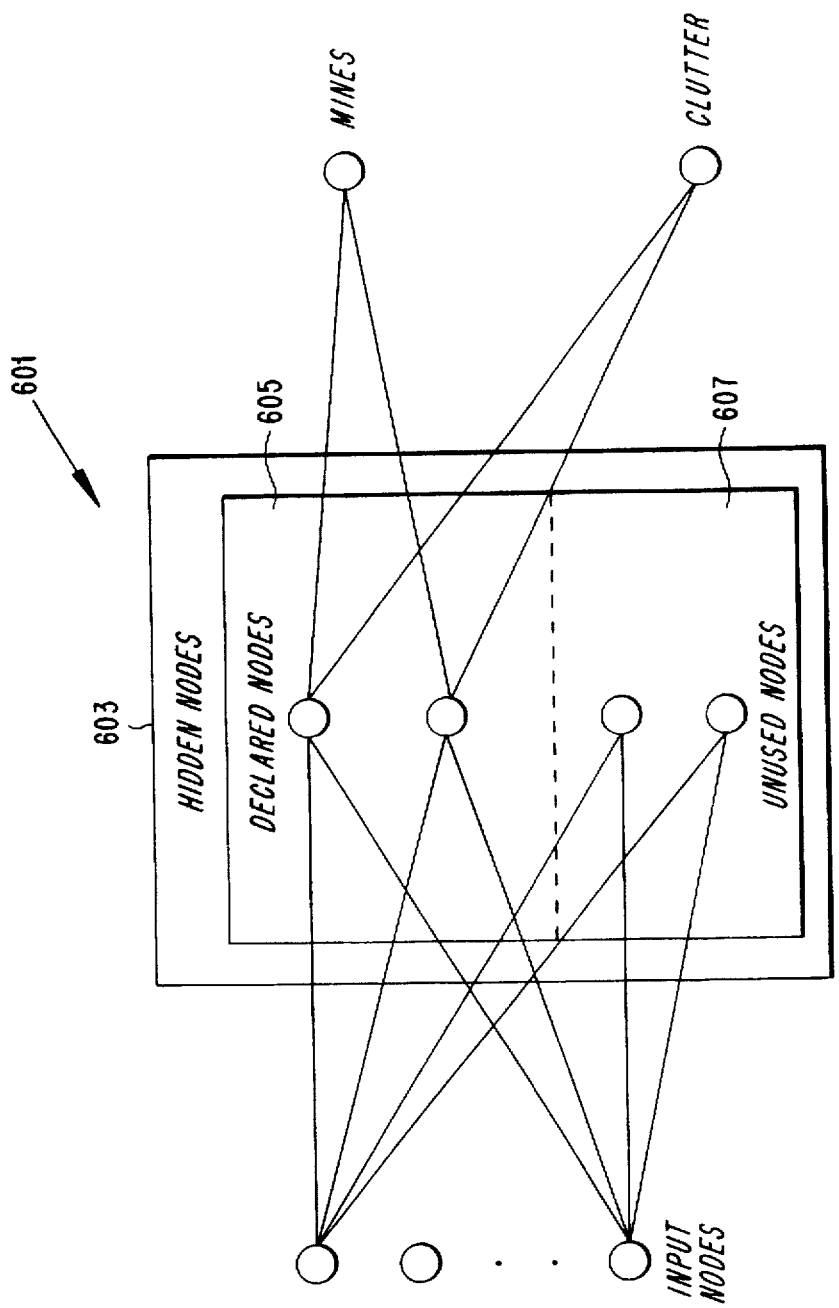
FIG. 6 is a block diagram of the architecture of a real time learning neural network in accordance with the present invention.

The architecture of an RTL network 505 will now be discussed with reference to FIG. 6. The RTL network architecture 601 consists of three layers of fully-connected nodes, with each one of the hidden nodes 603 resembling both a Grossberg instar (from the input layer) and a Grossberg outstar (to the output layer). A Grossberg instar is illustrated in FIG. 7(a), and a Grossberg outstar is illustrated in FIG. 7(b). The instar of the hidden nodes 603 "points" into feature space and is trained by altering the vector values that are its weights ($w_{ij}$), thus changing the direction of the vector to "find" the data. The outstar of the hidden nodes 603 produces the vector defined by the output weights ($z_{ij}$) upon activation. In accordance with one aspect of the present invention, the RTL network adds a reject radius about each instar vector in feature space. The reject radius defines a range of input data values which will be considered to correspond to the corresponding node. Any input vector falling inside a node's reject radius is clustered to that node and is said to "lie inside the node's reject radius".

The selection of a reject radius significantly affects the performance of the RTL network 505 as a classifier. In a preferred embodiment of the present invention, the selection of a reject radius for each node is performed automatically by means of evolutionary techniques, which use the paradigm of chance and selection, as found in biological evolution, to perform stochastic optimization. These techniques are fully described in the publication "Evolving Neural Networks", *Biological Cybernetics* 63, 487–493 (1990) by D. B. Fogel, which is incorporated herein by reference. In the RTL network 505, evolutionary techniques are used for finding the optimal reject radius based on the performance of the system as a whole. Initially, nodes receive randomly generated reject radii, and compete to classify a sequence of feature vectors. All of the competing nodes are a part of the adaptive, or "short-term", memory. As each node clusters a new feature vector, a Wald sequential hypothesis test determines whether that node has received enough information to act as a valid classifier over the feature space within that node's reject radius. Valid nodes are removed from the "short-term" class of nodes and placed in the "long-term" class of nodes. "Long-term" memory is comprised of formerly "short-term" clusters deemed valid classifiers that are no longer adaptive. (When automatic reject radius selection is not used, all RTL nodes are considered "long-term".) All other "short-term" nodes are probabilistically tested for removal based on the number of feature vectors they have not classified. That is, the longer a node fails to classify a vector, the more probable the node is to be removed. When a vector fails to cluster to an existing "long-term" node, the vector is passed to the "short-term" nodes. If this vector subsequently fails to cluster to an existing short-term node, the vector becomes the center for a new node with randomly generated parameters which then enters the competition with existing "short-term" nodes. In summary, an evolutionary technique creates nodes with random reject radii and probabilistically destroys nodes which fail to cluster feature vectors in a competition against other nodes.

The RTL network 505 adds a discriminant function to the outstar, the exact function added being a function of the number of input vectors clustered to that node. When only a few input vectors are used, the mean of the clustered vectors is used. However, when a sufficient number of input vectors are available to compute a nonsingular covariance matrix, a quadratic discriminant is calculated.

The hidden nodes 603 are divided into two groups: declared nodes 605 and unused nodes 607. The declared nodes 605 are those nodes within the hidden nodes 603 for which a reject radius has been defined. During training, vectors are examined to see whether they fall inside the reject radius of any existing declared nodes 605. If not, that vector is used to create a new node (in "short-term" memory when automatic reject radius selection is used), and the next vector is examined. In other words, during a training session, a reject radius centered around the vector is defined for one of the unused nodes 607, making that node a new one of the declared nodes 605. If there does exist a node within the declared nodes 605 ("long-term" nodes when automatic reject radius selection is used) to which the vector can be clustered (i.e., the vector falls within the reject radius of that node) and that node has a sufficient number of input vectors to calculate more than the mean, the vector is used in calculating that node's discriminant function. This discriminant function is that of the quadratic classifier:

$$d_i(X) = \ln p(w_i) - 0.5\{\ln|C_i| + (X-m_i)^T C_i^{-1}(X-m_i)\}$$

which is generated for each node. In the above equation, X represents the feature vector, $d_i$ represents the distance to the $i^{th}$ class, $C_i$ represents the $i^{th}$ covariance matrix, and $m_i$ represents the $i^{th}$ arithmetic mean. Use of the above discriminant function allows each node to generate a highly specific discriminant function over a local area rather than creating a single discriminant function to describe the entire feature space.

This is illustrated in FIG. 8, which depicts the testing operation of the RTL classifier. In the graph of feature space depicted in FIG. 8, the feature vectors corresponding to clutter (empty circles) and targets (solid circles) are plotted. Each circle that appears around each plotted feature vector is defined by the reject radius for that feature vector. According to the discriminant function for the RTL network, if an incoming feature vector falls within any one reject radius, then that incoming feature vector is classified according to the type of feature vector at the center of the circle. The classification of any incoming feature vector that falls within a region of overlap between two circles is described below with respect to the discussion of supervised learning. Of particular importance is the fact that if an incoming feature vector does not fall within the reject radius of any existing node, then the RTL network 505 outputs a classification that indicates "novelty". The expert system 507 may use this information to train the RTL network 505 in real time, by means of the learning connection 511, if the expert system can determine from other sources the actual classification of the incoming feature vector that produced the "novelty" indication. As explained above, this real-time training can take place because the architecture of the RTL network 505 permits it to learn without having to use the entire training data set that it previously trained on.

Figure 9B:
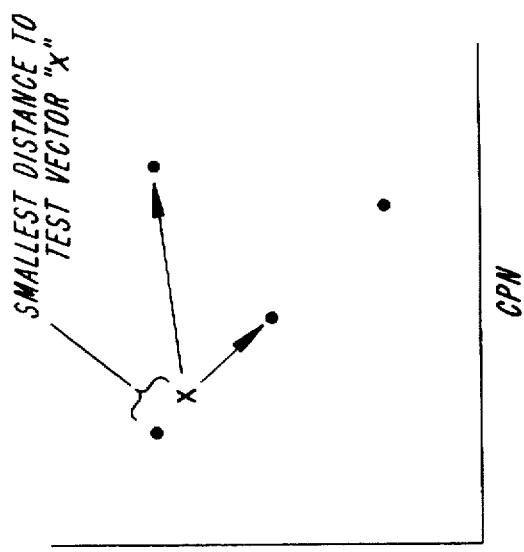
FIGS. 9($a$)–9($b$) depict, respectively, a preferred clustering operation of a real time learning neural network in accordance with the present invention, and a clustering operation of the prior art counterpropagation network.
Figure 9A:
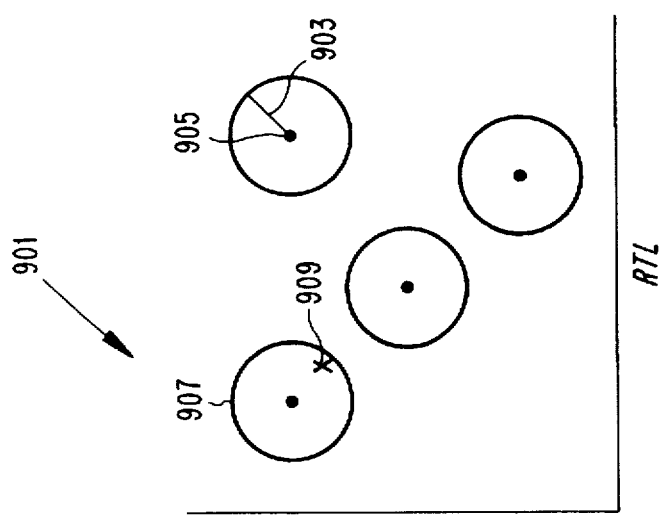

Training of the inventive RTL network will now be described with reference to FIG. 9(a). During training of the classifier, the initial step of the RTL network 505 is to cluster the incoming feature vector, as depicted in the feature map 901 shown in FIG. 9(a). This is similar to the initial step applied in the prior art counterpropagation network (CPN), depicted in FIG. 9(b), in which the incoming feature vector, x, is clustered to the closest node. In the inventive RTL network 505, however, rather than clustering the incoming feature vector to the nearest established node, a reject radius 903 around the existing node 905 is applied in order to decide whether an input vector 505 lies "close enough" to an established node.

In accordance with the present invention, the next step during the training of the RTL network 505 depends upon the outcome of the initial step. If the incoming feature vector lies within the reject radius 903 of any existing node, then the feature vector is clustered (i.e., associated with the other feature vectors for this node) and may be used to recompute the mean and covariance for each class represented within the node.

If the vector falls inside the reject radius of several overlapping nodes, the vector is classified either on the "maximum likelihood" of belonging to one class or the other if all nodes possess a sufficient number of features for statistics to be calculated, or if there are too few features to generate covariance matrices, the input feature vector is classified by finding the smallest Euclidean distance between the input vector and the means of the overlapping nodes.

However, if the feature vector is not close enough to any existing node to be within the region defined by its reject radius 903, then a new node will be created which contains the feature vector as its original and currently only member. In this respect, the RTL network resembles Grossberg's F2 layer in Adaptive Resonance Theory (ART), where the reject radius of the present application parallels ART's vigilance parameter, and new nodes are created when old nodes cannot sufficiently match the input. Unlike ART, however, old training vectors are not needed after training as the reject radius detects novelty and keeps a node from "walking away" from its original training data. Also unlike ART, the RTL allows for ready adjustment and optimization of the vigilance parameter (the reject radius). ART is thoroughly described in *Neural Networks Primer* by Maureen Caudill, which was cited and incorporated by reference above.

The above-described architecture allows the RTL network 505 to efficiently divide the problem of finding the underlying distributions in the data into a simpler, more local mapping of sub-distributions and to be capable of clearly knowing when a feature vector is "sufficiently novel" to require a new node. When a new node is required, the RTL network 505 sends a signal, indicating the incoming feature vector's novelty, to the expert system 507. This is important to the operation of the system as a whole during testing.

The RTL network 505 may be trained in either a supervised or an unsupervised learning mode. The term "supervised learning" is generally used in the art to refer to training in which a neural network is provided with training patterns as well as target answers. In contrast, "unsupervised learning" occurs when the neural network is trained by supplying only the training patterns without the target answers. These two modes of operation will now be described in more detail.

The training set (i.e., the set of input and output patterns) for supervised learning in the RTL network 505 is generated during system operation from calibration data. Since the location of the targets in the calibration data are known, the pattern vectors can be labeled as either clutter or target.

The RTL network 505 begins with a single defined node with weight values $W_{ij}$ having values of the first pattern vector $X_k$, where i indexes the class of the pattern vector, and, hence, the class assigned to the node; j indexes the node number in class i; and k is the number of the pattern vector. For every pattern vector presented to the system while learning is engaged, the Euclidean distance (D) is calculated between the pattern vector and every node assigned to the same class as the pattern vector, according to the following equation:

$$D_{ij}(X_k) = \|X_k - W_{ij}\|$$

If the minimum Euclidean distance over all nodes assigned to class i is greater than a threshold E, a new node is added with the pattern vector being assigned as the new node weight values. This is performed for every pattern vector in the training set, resulting in a partitioning of feature space into regions. This is done in a manner that permits a wide range of algorithms for determining a discriminant function, which is determined in a second pass through the training set.

In a preferred embodiment, the discriminant function is formed by taking a frequency count to determine the number of vectors in both classes that fall within the volume determined by the minimum Euclidean distance from each node. Every node with only a single class type that falls within its volume is labeled with a specific class label and assigned with a confidence value of 0.9 for subsequent classification. Nodes that result in a nonsingular covariance matrix for both types of classes that fall within its volume are designated as Gaussian nodes, and the mean and covariance matrices are calculated for all vectors in the node as well as for each class in the node. The determinants and inverse matrices are calculated and stored as part of the nodes features. Nodes having too few pattern vectors of each class to generate a non-singular covariance matrix are flagged, and only the mean of each class is stored as a node feature.

After the RTL network 505 has completed its supervised learning session and is ready for operational use, a pattern vector $X_k$ of unknown classification is presented to the classifier. The pattern vector is assigned to node (ij) if $D_{ij}(X_k) < D_{il}(X_k)$ for all $i \neq j$ over all nodes 1.

If the node has been assigned a specific class label (all of the vectors in the nodes are clutter), the pattern vector receives that label and the classification process is complete. If the node has only mean vectors as features, the Euclidean distance is calculated to the mean vectors of the classes represented in the node, and the class assignment is made based on the minimum Euclidean distance. Finally, if both mean and covariance matrices are features of the node, the node is treated as an independent event, and the discriminant calculated according to a Bayesian-like decision rule. The discriminant function for node i is given by $$d_i(X) = \ln r(w_i) - 0.5 \ln |C_i| - 0.5[(X-m_i)^T C_i^{-1}(X-m_i)]$$

where $r(w_i)$ is the a priori class probability of class i; C is the covariance matrix; $|C_i|$ is the determinant of the covariance matrix; and $m_i$ is the mean vector associated with class i. The vector is assigned to class $w_i$ if $$di(X) < dj(X) \text{ for all } j \neq i$$

Thus, the classification decision is based on one of three criteria, beginning with the Euclidean distance, for nets trained using supervision.

For unsupervised learning, only clutter is used as the training set. Imagery from the scene at hand that is known not to include targets is used to extract candidate object vectors.

The RTL network 505 begins with a single node with weight values $W_{ij}$ having values of the first pattern vector $X_k$, where i indexes the class of the pattern vector, and, hence, the class assigned to the node; j indexes the node number in class i; and k is the number of the pattern vector. For every pattern vector presented to the system while learning is engaged, the Euclidean distance is calculated between the pattern vector and every node assigned to the same class as the pattern vector, according to the following equation:

$$D_{ij}(X_k) = \|X_k - W_{ij}\|.$$

If the minimum Euclidean distance over all nodes assigned to class i is greater than a threshold E, a new node is added with the pattern vector being assigned as the new node weight values. This is performed for every pattern vector in the training set, resulting in a partitioning of feature space into regions representing only clutter.

For use as a classifier, a pattern vector $X_k$ of unknown classification is presented to the RTL network 505. The pattern vector is assigned to node (ij) if $$D_{ij}(X_k) < D_{il}(X_k) \text{ for all } i \neq j \text{ over all nodes } 1.$$

Since, for unsupervised learning, the node has been assigned a specific class label "clutter", the classification process is complete. If the unknown vector lies outside of all nodes, then it is classified as novel and may be handled as a potential target.

In practice, it is preferable to preprocess the feature vector by mapping it to the unit hypersphere. This helps limit the number of nodes required to span feature space by conditioning the data so that all clustering will occur on the surface of the sphere. Each feature in the vector is first scaled by an approximate maximum value for that feature type. This gives each feature a roughly equal range on (−1, 1) called the "rough-scale" vector. The vector as a whole is mapped to the unit sphere by scaling each feature by the length of the rough-scale vector $$\text{length} = \sqrt{(x_1^2 + \ldots + x_n^2)}$$

to create the "unit vector"

$$\{m_1, \ldots, m_n\} = \{x_1/\text{length}, \ldots, x_n/\text{length}\}.$$

During the learning process, the first vector received becomes the first node allocated on the unit hypersphere. Each node contains a running total of the information content of all feature vectors clustered to it, and so the mean of the node simply becomes the vector itself. Though the actual center of the node never moves, a mean vector and covariance matrix is updated as each new vector is clustered to the node allowing the vector itself to be forgotten since the node "gains the vector's information". Given v is an n-dimensional feature vector, the mean of node i, $m_i$ is $$m_i^{new} = m_i^{old} + v/N$$

and the covariance of the node, Ci, is $$C_i^{new} = \frac{N-1}{N} \left( C_i^{old} + \frac{N}{(N+1)(N-1)} (v - m_i)(v - m_i)^T \right)$$

In implementing this algorithm, it is important to remember that the covariance matrix will be zero for the first vector. As the second vector arrives, its Euclidean distance is then calculated to the established node and if this distance is less than the reject radius, the feature vector is clustered to that node. For a node mean vector, $M_{node}$, the Euclidean distance is $$d_E = \sqrt{\sum_{i=0}^{n} (v_i - (M_{node})_i)^2}$$

The node's mean and covariance are then updated accordingly. If, however, the feature vector lies too far from the existing node, the feature vector itself becomes the center for a second node. If a vector lies within the reject radius of two or more nodes, a second order distance using the covariance matrix determines the node to which the vector is clustered.

In supervised training, the true class of the vector is known and can be used to build another level into the classifier. Besides maintaining a running node mean and covariance, each node maintains a running class mean and covariance. Thus, a separate classifier is maintained for each class within the node.

During testing of the RTL network 505, each vector processed by the classifier receives a classification; whether that of the node to which it is clustered or as a "novel" node if it makes a new cluster. The Euclidean distance is computed from the test vector to the node mean of each node, the node yielding the smallest distance being the winner. If the winner's distance is less than the reject radius, the vector is clustered to that node. Operating the classifier, then, simply requires a count be kept of the number of test feature vectors of a known class which are correctly clustered to a node of the same class in the case of supervised learning, or are not clustered to a previously existing node in the unsupervised, or "novelty" case. If supervised training has been used, a vector is "clustered" into a node containing training vectors of more than one class, and the Mahalanobis distance is computed from the vector to each class mean in the node. For a covariance matrix, S of a given class, the Mahalanobis distance is $$d_M = \sqrt{(v - M_{node})^T S^{-1}(v - M_{node})}$$

The class with the smallest distance is declared the winner and becomes the class of the test vector.

Figure 10B:
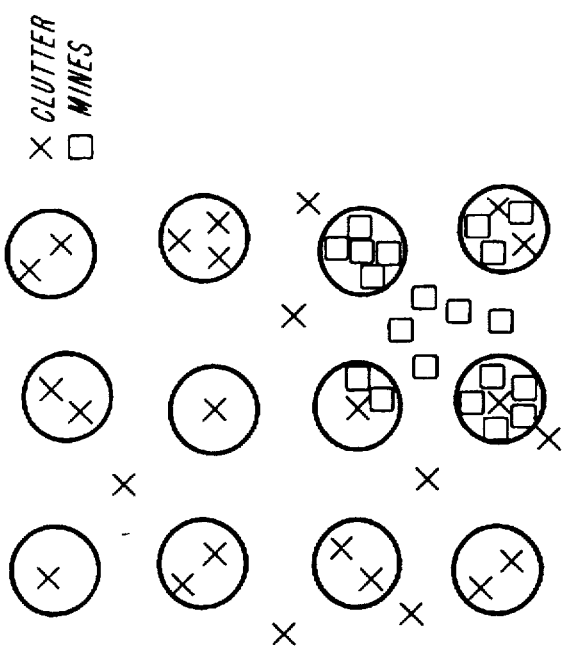
FIGS. 10($a$)–10($b$) depict exemplary node distributions resulting from the spatial novelty detection and the node density threshold learning paradigms in accordance with the present invention.
Figure 10A:
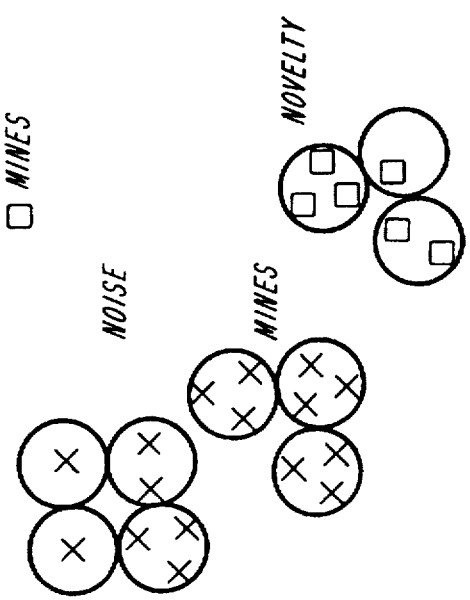

There are two strategies for training the RTL network 505 in the unsupervised learning mode. The first of these, called "spatial novelty detection," builds the neural network one node at a time. Feature space regions of clear separability become populated by nodes labeled "all clutter". To accomplish this, the RTL network 505 is initialized early in the mission on known clutter data and continuously updated every kilometer throughout the mission. This bootstrapping process requires that the sensor image an area where there are no minefields. Testing, or classification, then takes place on data collected over terrain where knowledge about minefield location is desired. The RTL network 505 then signals the occurrence of novelty, that is, object vectors that are considered different from the training (clutter) vector set. This method of training results in overlapping regions of data becoming populated by nodes which build discriminant functions over a small feature-space volume, thus becoming very precise discriminants. For clearly separable classes with high in-class variance, this strategy identifies samples containing mines and novel items quite well. An example of node distribution through feature space using this approach is illustrated in FIG. 10(a).

For more compact, overlapping data sets, the second approach, called the "node density threshold" approach, recognizes novelty better since it gives a broader view of feature space. In this learning approach, nodes are arbitrarily created and assigned with values in feature space encompassing the full range of expected mines and clutter that are passed from the sensor. Then, when flying over the target terrain, the RTL is used to simply count the number of vectors in each node within minefield-sized areas on the ground. When many vectors appear in one (or several) nodes—enough to cross a statistical threshold—those node(s) vectors are declared mines. In this case, similarity of mine signatures is used to cue minefield detection. The relation of the node locations throughout the feature space are shown in FIG. 10(b). By populating feature space with nodes of equal volume, compact, overlapping regions will be quickly identified, and the distribution of elements in each node (that node's "threshold") will determine the threshold. If, suddenly, a large number of mines is encountered which all fall in one node, the RTL network 505 will flag a novelty detection. A system which attempted to classify all of these feature reports based purely on a distance discriminant would, most likely, misclassify many of the vectors and thus miss the minefield.

Figure 11:
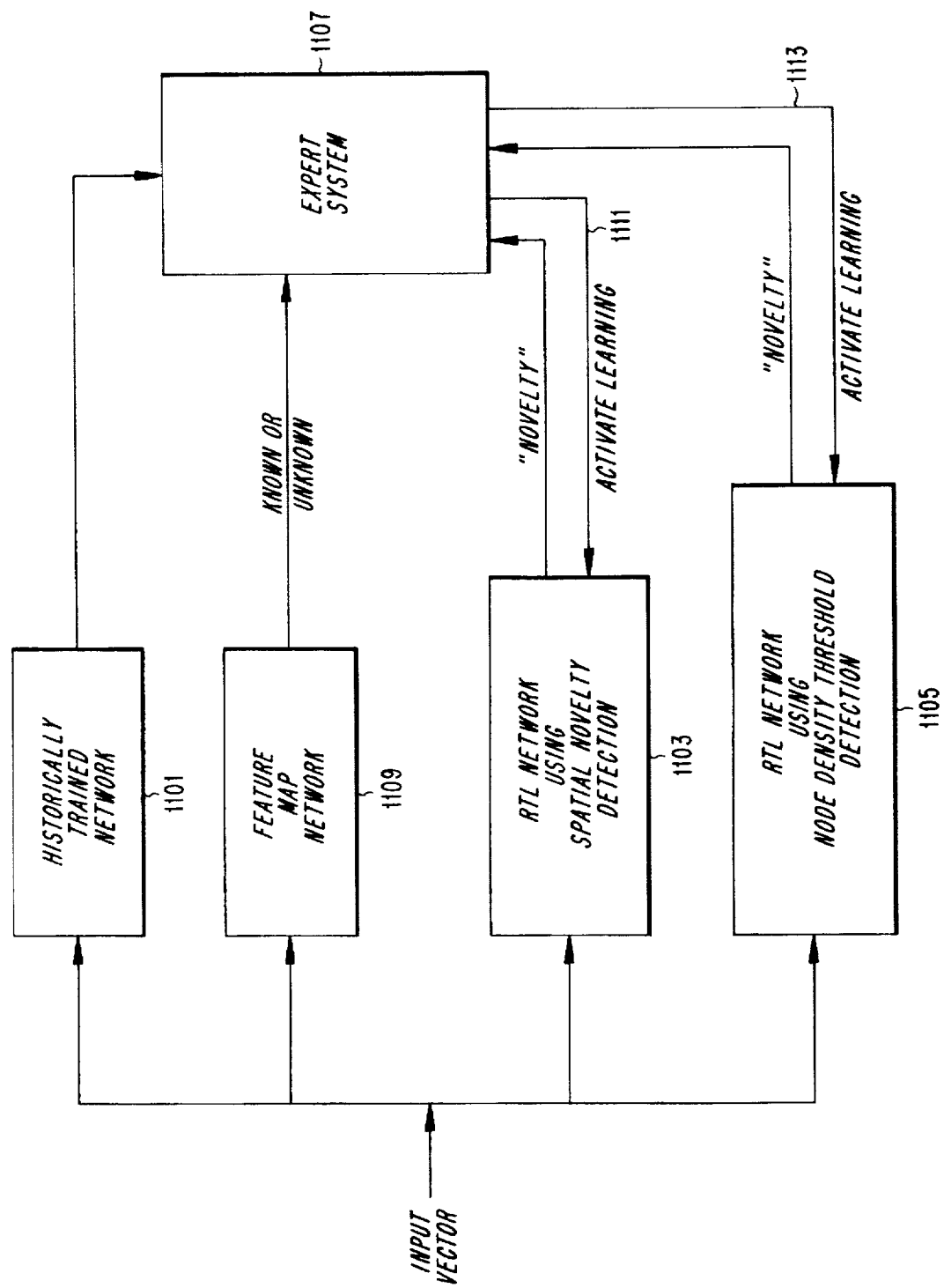
FIG. 11 is a block diagram of an alternative embodiment of the perceptive system in accordance with the present invention.

The perceptive system has been described with reference to only three classifiers. However, the perceptive system may be expanded to include any number of classifiers operating in parallel, with the expert system determining which is producing the most reliable output. For example, in an alternative embodiment of the present invention, the RTL network 505 may comprise two separate RTL networks operating in parallel. One of these RTL networks is trained using the spatial novelty detection paradigm, and the other is trained using the node density threshold paradigm, both described above. An example of this system is illustrated in FIG. 11. The "historical" network 1101 is an RTL network (or BPN) network which previously showed good performance identifying mines under conditions similar to those encountered at the time and place of interest. The spatial novelty detection RTL network 1103 and node density threshold RTL network 1105 begin the mission completely untrained and adapt and grow as the data begins arriving. The expert system 1107 uses the output of the feature map network 1109 to decide whether conditions are similar enough to those under which the historical network 1101 was trained. If so, the output of the historical network 1101 is used. Otherwise, the output of the two RTL networks trained "on the fly" is deemed a more appropriate indicator. In addition, based on sensor and other environmental input, the expert system adjusts the parameters of the RTL networks 1103, 1105 for maximum efficiency and accuracy by means of the respective learning control paths 1111, 1113.

The nature of the RTL network 505 allows modification to achieve additional measurements if required. For example, the RTL network 505 can generate the probability that an input vector belongs to each possible class and then perform a maximum likelihood classification, as fully described in *Pattern Classification And Scene Analysis* by Duda and Hart, which was cited and incorporated by reference above. This allows data validity to be accomplished in support of the expert system's decision making process. This maximum likelihood (ML) estimation may include so-called fuzzy, or continuous valued logic, estimation. This fuzzy estimation allows for arbitrary levels of "probabilistic" assignation to support global comparisons on likelihood across the entire feature space. In standard ML techniques, the probabilities must sum to one at each point in feature space, when probabilities are assigned between classes. The use of fuzzy logic allows the sum to be arbitrary, thereby allowing the locations in feature space relative to each other to have more definite assignation of higher or lower confidence of being correctly classified. A thorough description of Fuzzy Logic may be found in a publication by Zadeh entitled "Fuzzy Sets", published in *Information and Control*, vol. 8, pp. 338–353 (1965), which is incorporated herein by reference.

It can be seen from the above discussion that the present invention combines the classical artificial intelligence (AI) approach (i.e., the expert system) with the neural network approach, in effect achieving a cybernetic approach in the classical sense of that term. The term "cybernetics" was formerly used to describe an interdisciplinary approach to the study of control and communication in animals, humans, machines, and organizations, coined by Norbert Wiener in 1946. The term "cybernetic" continues to be used in a very general sense in computer studies, but cybernetics as a separate discipline gradually declined as its insights were absorbed into the framework of other fields, such as AI and neural networks.

The methodology employed in the present invention is required because of the chaotic systems that make up real environments and the interactions with those environments, whether the application be image processing for ATR or temperature and pressure control for enhanced engine efficiency.

The use of multiple networks in parallel is particularly well-suited for solving complex real-world problems. One such problem is ATR, having a prime objective of classifying objects perceived by one or more sensors in order to distinguish between mines and clutter under all conditions, including weather, countermeasures, and the like. A rule of thumb regarding classifiers is that no single classifier exists which can find all of the specific cases of a complex data set all of the time. Better performance can be achieved with a classifier that distinguishes and classifies only specific instances, for example, mine type A on a cloudy day against grass, etc. It is hoped, then, that such simplified distributions of target vectors and clutter vectors will be convex in feature space and, therefore, that Gaussian distributions will more accurately model the underlying distribution. The drawback is the increased computational load of running several classifiers on each mine. Thus, the solution employed in the present invention provides a computationally fast, adaptable classifier and configures it in several ways to address real world classification problems.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A neural network, comprising:

input means for receiving an input feature vector;

a first layer, coupled to said input means, comprising:

a first declared node, including:

a first feature vector; and a first hypervolume defined by said first feature vector and a first reject radius;

a second declared node, including:

a second feature vector; and a second hypervolume defined by said second feature vector and a second reject radius, wherein a portion of said second hypervolume overlaps a portion of said first hypervolume, thereby defining an overlapping region; and first means for clustering said input feature vector alternatively to only one of said first declared node and said second declared node if said input feature vector lies within said overlapping region.

2. The neural network of claim 1, wherein said first layer further comprises an unused node, and wherein said neural network further comprises second means for clustering said input feature vector to said unused node only if said input feature vector is not located within either of said first and second hypervolumes.

3. The neural network of claim 1, wherein said first means determines which of said first or second declared nodes said input feature vector will be clustered to in accordance with maximum likelihood statistics.

4. The neural network of claim 1, wherein said first means determines which of said first or second declared nodes said input feature vector will be clustered to in correspondence with which of a first Euclidean distance and a second Euclidean distance is smaller, said first Euclidean distance being determined from said input feature vector to an arithmetic mean of said first declared node, and said second Euclidean distance being determined from said input feature vector to an arithmetic mean of said second declared node.

5. The neutral network of claim 1, further comprising means for automatically adjusting and optimizing the reject radius for the first declared node.

6. A perceptive system, comprising:

input means for receiving an input feature vector;

a first classifier, coupled to said input means, for generating a first classification signal corresponding to said input feature vector, said first classifier generating said first classification signal with the use of a training data set that includes a target feature vector;

first means, coupled to said input means, for generating a first signal indicating whether or not said input feature vector is in a same general region of feature space as said training data set;

a second classifier comprising real-time learning means, coupled to said input means, for generating a real-time classification signal based on said input feature vector and a real-time data set; and selection means, coupled to said first classifier, said first means, and said real-time learning means, for using said first signal to select as a system output one of said first classification signal and said real-time classification signal.

7. The perceptive system of claim 6, wherein said selection means is an expert system.

8. The perspective system of claim 6 wherein said real-time learning means is a neural network comprising:

input means for receiving said input feature vector;

a first layer, coupled to said input means, comprising a node;

means for clustering said input feature vector to said node only if a distance between said input feature vector and a node feature vector is less than a reject radius associated with said node;

means for generating a classification signal in response to said input feature vector being clustered to said node; and a second layer, coupled to said first layer, including means for outputting a novelty signal during testing of the real-time learning means if said means for clustering fails to cluster said input feature vector to said node.

9. The perspective system of claim 6, further comprising data feedback means, coupled to said selection means and said real-time learning means, for providing real-time correlation data to said real-time learning means, wherein said real-time learning means adaptively optimizes nodes in said real-time data set during testing of the real-time learning means.

10. The perspective system of claim 6, wherein the selection means further includes means for establishing a level of confidence measure for the real-time classification signal generated by the real-time learning means and the first classification signal generated by the first classifier.

11. The perspective system of claim 6, wherein the first classifier, the first means, and the real-time learning means are independent neural networks operating in parallel with respect to each other.

12. The perspective system of claim 6, wherein the real-time learning means further includes:

first training means using a spatial novelty training strategy; and second training means using a node density training strategy.

13. A method for classifying an object, comprising the steps of:

sensing said object to produce a feature vector;

receiving said feature vector in a neural network having a node;

in said neural network, clustering said received feature vector to said node only if a distance between said received feature vector and a node feature vector is less than a reject radius associated with said node;

in said neural network, generating a first classification signal only if said node has at least a predetermined number of feature vectors clustered to it, wherein said predetermined number is greater than one.

14. A method for classifying an object, comprising the steps of:

sensing said object to produce a feature vector;

receiving said feature vector in a first classifier;

in said first classifier, using a training data set that includes a target feature vector to generate a first classification signal corresponding to said input feature vector;

generating a first signal indicating whether or not said feature vector is in same general region of feature space as the training data set;

receiving said feature vector in a second classifier comprising real-time learning means;

in said real-time learning means, generating a real-time classification signal based on said input feature vector and a real-time data set; and using said first to select as a classification of said object one of said first classification signal and said real-time classification signal.

15. The method of claim 14, wherein said step of using said first signal further comprises the step of generating a feedback signal that includes real-time correlation data; and wherein said method of classifying an object further comprises the step of receiving the feedback signal, in said real-time learning means, for revising said real-time data set using evolutionary techniques.

16. The method of claim 14, wherein using the first signal to select one of said first classification signal and said real-time classification signal further includes establishing a level of confidence measure for the real-time classification signal and the first classification signal.

17. The method of claim 14, wherein generating the first classification signal using the training data set, generating the first signal, and generating the real-time classification signal are independent steps being executed in parallel with respect to each other.

18. The method of claim 14, wherein generating the real-time classification signal further includes:

training the real-time learning means using a spatial novelty training strategy; and training the real-time learning using a node density training strategy.

19. A method of controlling a real-time learning neural network, said method comprising the steps of:

controlling the real-time learning neural network to detect whether a feature vector fails to cluster to an existing node, and in response to said detection then generating a new node based on the feature vector;

controlling the real-time learning neural network to select a reject radius for the new node from a number of stochastically generated reject radii; and controlling the real-time learning neural network to detect whether the existing node has a statistically significant number of feature vectors clustered to it, and in response to said detection then designating the existing node as a valid classifier.

20. The method in accordance with claim 19, further comprising the step of:

controlling the real-time learning neural network to remove the existing node if the existing node fails to cluster a statistically significant number of feature vectors.

21. A method for controlling a real-time learning neural network, said method comprising the steps of:

controlling the real-time learning neural network to receive a feature vector;

controlling the real-time learning neural network to detect whether the feature vector falls within a stochastically generated reject radius surrounding an existing node, and in response to said detection then clustering the feature vector to the existing node;

controlling the real-time learning neural network to detect whether the feature vector fails to cluster to the existing node, and in response to said detection then generating a new node based on the feature vector;

controlling the real-time learning neural network to select a reject radius for the new node from a number of stochastically generated reject radii; and controlling the real-time learning neural network to detect whether the existing node has a statistically significant number of feature vectors clustered to it, and in response to said detection, then optimizing the reject radius of the existing node and designating the existing node as a valid classifier, wherein the feature vector can cluster to only one node in the real-time learning neural network.

22. The method in accordance with claim 21, further comprising the step of:

controlling the real-time learning neural network to remove nodes from the real-time learning network that fail to cluster a statistically significant number of feature vectors.

23. A method for classifying feature vectors in a real-time learning neural network, said method comprising the steps of:

in a first layer of the real-time learning network that contains a non-adaptive node, clustering a feature vector to the non-adaptive node if the feature vector falls within a reject radius surrounding the non-adaptive node;

if the feature vector clusters to the non-adaptive node in the first layer, then generating a classification signal, wherein the classification signal indicates that the feature vector belongs to a class associated with the non-adaptive node;

if the feature vector fails to cluster to the non-adaptive node in the first layer of the real-time learning network, then supplying the feature vector to a second layer of the real-time learning network and performing the steps of:

clustering the feature vector to an adaptive node in the second layer of the real-time learning network if the feature vector falls within a reject radius surrounding the adaptive node;

generating a new adaptive node in the second layer based on the feature vector if the feature vector fails to cluster to the adaptive node;

selecting a reject radius for the new adaptive node from a number of stochastically generated reject radii;

converting the adaptive node to a new non-adaptive node and removing the new non-adaptive node from the second layer and adding the new non-adaptive node to the first layer, if the adaptive node has a statistically significant number of feature vectors clustered to it; and removing the adaptive node from the real-time learning network if it fails to cluster a statistically significant number of feature vectors, wherein the feature vector can cluster to only one node in the real-time learning neural network.

24. The method in accordance with claim 23, further comprising the step of:

adjusting and optimizing the adaptive node.

25. The method of claim 24, wherein said step of adjusting and optimizing the adaptive node comprises the step of:

adjusting and optimizing the reject radius of the adaptive node.

26. A real-time learning neural network employing competitive training, said network comprising:

means for controlling the real-time learning neural network to generate a new node based on a feature vector, if the feature vector fails to cluster to an existing node;

selection means for controlling the real-time learning neural network to select a reject radius for the new node from a number of stochastically generated reject radii; and means for controlling the real-time learning neural network to designate the existing node as a valid classifier, if the existing node has a statistically significant number of feature vectors clustered to it.

27. A real-time learning neural network for classifying feature vectors, said network comprising:

a first layer containing a non-adaptive node;

means for clustering a feature vector to the non-adaptive node in said first layer, if the feature vector falls within a reject radius surrounding the non-adaptive node;

means for generating a classification signal, if the feature vector clusters to the non-adaptive node in said first layer, wherein the classification signal indicates that the feature vector belongs to a class associated with the non-adaptive node;

means for supplying the feature vector to a second layer, if the feature vector fails to cluster to said one of the non-adaptive node in said first layer;

means for clustering the feature vector to an existing adaptive node in said second layer, if the feature vector falls within a reject radius surrounding the adaptive node;

means for generating a new adaptive node in said second layer based on the feature vector if the feature vector fails to cluster to the existing adaptive node;

selection means for selecting a reject radius for the new adaptive node from a number of stochastically generated reject radii;

means for converting the adaptive node to a new non-adaptive node and for removing the new non-adaptive node from the second layer and adding the new non-adaptive node to the first layer, if the existing adaptive node has a statistically significant number of feature vectors clustered to it; and means for removing the adaptive node from the real-time network if the adaptive node fails to cluster a statistically significant number of feature vectors, wherein the feature vector can cluster to only one node.

* * * * *